(12) United States Patent  
Yin et al.

(10) Patent No.: US 12,112,445 B2
(45) Date of Patent: Oct. 8, 2024

(54) TRANSFERRING GEOMETRIC AND TEXTURE STYLES IN 3D ASSET RENDERING USING NEURAL NETWORKS

(71) Applicant: Nvidia Corporation, Santa Clara, CA (US)

(72) Inventors: Kangxue Yin, Toronto (CA); Jun Gao, Toronto (CA); Masha Shugrina, Toronto (CA); Sameh Khamis, Alameda, CA (US); Sanja Fidler, Toronto (CA)

(73) Assignee: Nvidia Corporation, Santa Clara, CA (US)

( * ) Notice: Subject to any disclaimer, the term of this patent is extended or adjusted under 35 U.S.C. 154(b) by 69 days.

(21) Appl. No.: 17/467,792

(22) Filed: Sep. 7, 2021

(65) Prior Publication Data

US 2023/0074420 A1 Mar. 9, 2023

(51) Int. Cl.
| | |
|---|---|
| *G06T 19/20* | (2011.01) |
| *G06N 3/045* | (2023.01) |
| *G06T 3/02* | (2024.01) |
| *G06T 3/18* | (2024.01) |
| *G06T 7/11* | (2017.01) |
| *G06T 15/04* | (2011.01) |
| *G06T 17/20* | (2006.01) |

(52) U.S. Cl.
CPC ............ *G06T 19/20* (2013.01); *G06N 3/045* (2023.01); *G06T 3/02* (2024.01); *G06T 3/18* (2024.01); *G06T 7/11* (2017.01); *G06T 15/04* (2013.01); *G06T 17/20* (2013.01); *G06T 2200/04* (2013.01); *G06T 2207/20084* (2013.01); *G06T 2219/2021* (2013.01)

(58) Field of Classification Search
CPC ......... G06T 19/20; G06T 7/11; G06T 3/0006; G06T 3/0093; G06T 15/04; G06T 17/20; G06T 2200/04; G06T 2207/20084; G06T 2219/2021; G06N 3/045
See application file for complete search history.

(56) References Cited

U.S. PATENT DOCUMENTS

| | | | |
|---|---|---|---|
| 11,551,429 B2* | 1/2023 | Rong | G06T 11/00 |
| 2009/0027412 A1* | 1/2009 | Burley | G06T 15/04 |
| | | | 345/582 |
| 2018/0068463 A1* | 3/2018 | Risser | G06T 7/45 |
| 2018/0144535 A1* | 5/2018 | Ford | G06T 15/005 |
| 2018/0211373 A1* | 7/2018 | Stoppa | G06T 7/55 |
| 2019/0026958 A1* | 1/2019 | Gausebeck | H04N 13/10 |
| 2019/0060602 A1* | 2/2019 | Tran | G06F 3/013 |
| 2019/0122411 A1* | 4/2019 | Sachs | G06F 18/23 |

(Continued)

*Primary Examiner* — Yujang Tswei
(74) *Attorney, Agent, or Firm* — Hogan Lovells US LLP

(57) ABSTRACT

Generation of three-dimensional (3D) object models may be challenging for users without a sufficient skill set for content creation and may also be resource intensive. One or more style transfer networks may be used for part-aware style transformation of both geometric features and textural components of a source asset to a target asset. The source asset may be segmented into particular parts and then ellipsoid approximations may be warped according to correspondence of the particular parts to the target assets. Moreover, a texture associated with the target asset may be used to warp or adjust a source texture, where the new texture can be applied to the warped parts.

18 Claims, 13 Drawing Sheets

(56) References Cited

U.S. PATENT DOCUMENTS

| | | | |
|---|---|---|---|
| 2020/0082249 A1* | 3/2020 | Hua | G06N 3/045 |
| 2020/0258223 A1* | 8/2020 | Yip | G06T 11/00 |
| 2021/0065418 A1* | 3/2021 | Han | G06T 7/73 |
| 2021/0073944 A1* | 3/2021 | Liu | G06T 5/002 |
| 2021/0142577 A1* | 5/2021 | Thomas | G06F 18/214 |
| 2021/0166380 A1* | 6/2021 | Yip | G06V 10/44 |
| 2021/0209388 A1* | 7/2021 | Ciftci | G06N 3/08 |
| 2021/0248762 A1* | 8/2021 | Pfister | G06T 5/006 |
| 2021/0279950 A1* | 9/2021 | Phalak | G06T 17/00 |
| 2021/0342669 A1* | 11/2021 | Godwin, IV | G06N 3/08 |
| 2021/0383589 A1* | 12/2021 | Risser | G06N 3/045 |
| 2022/0026920 A1* | 1/2022 | Ebrahimi Afrouzi | G06N 3/084 |
| 2022/0027672 A1* | 1/2022 | Xu | G06N 3/045 |
| 2022/0076133 A1* | 3/2022 | Yang | G06N 3/08 |

* cited by examiner

TRANSFERRING GEOMETRIC AND TEXTURE STYLES IN 3D ASSET RENDERING USING NEURAL NETWORKS

BACKGROUND

Three-dimensional (3D) object models may be used to provide content to users in various applications, such as videos, animated media, video games, or other types of content. Development of these object models may be difficult, with creators often having significant levels of skill and using large amounts of time to generate realistic looking models. Often, the time and skill level serve as barriers to entry for users looking to generate object models. Additionally, time constraints may lead to more copying and pasting in applications, such as video games, where numerous background characters are present within scenes, but may not be the focal point of activity. As a result, user-driven content creation may be limited to certain individuals or entities having sufficient time and resources for content generation.

BRIEF DESCRIPTION OF THE DRAWINGS

Various embodiments in accordance with the present disclosure will be described with reference to the drawings, in which.

DETAILED DESCRIPTION

Figure 1:
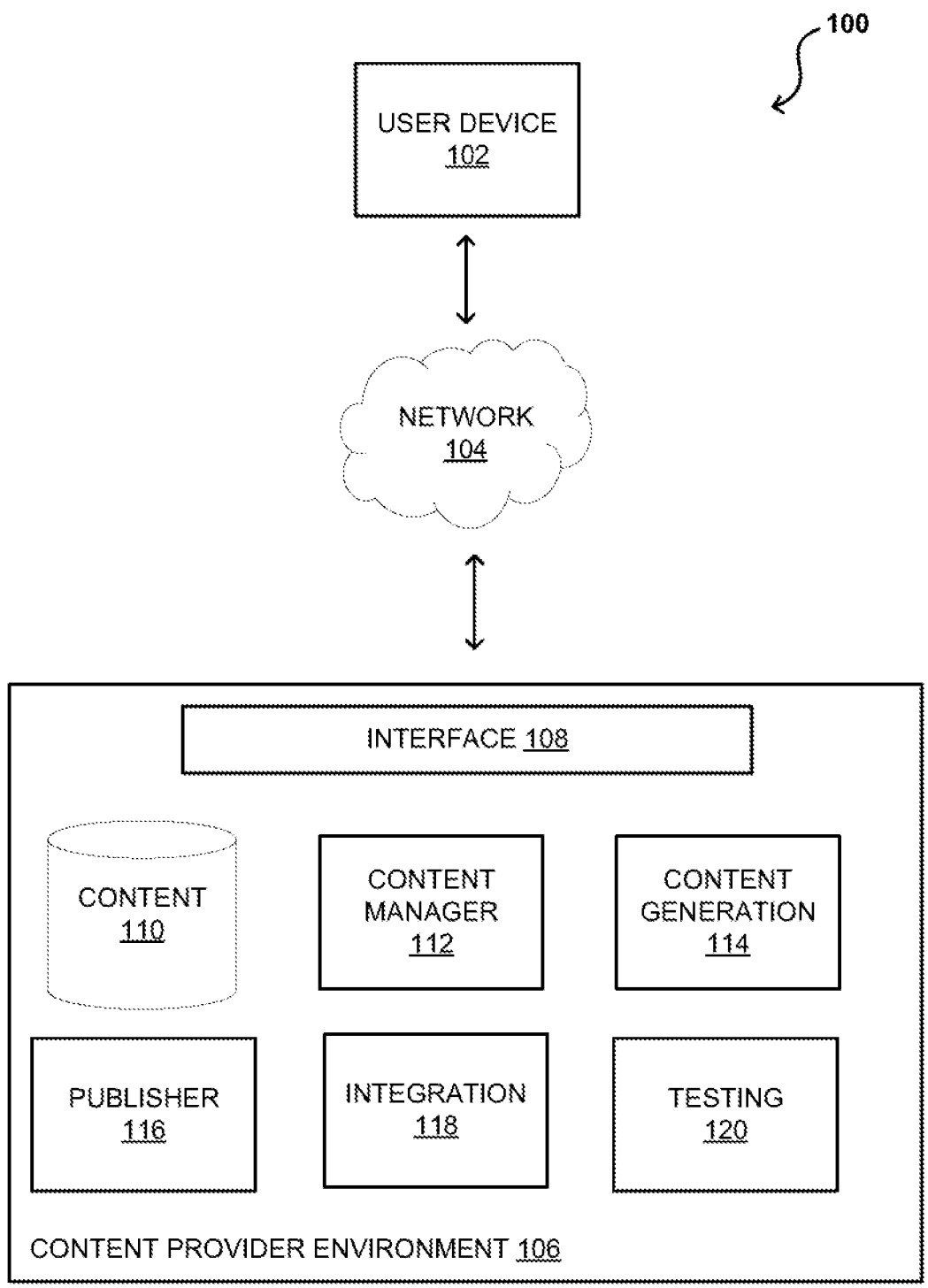
FIG. 1 illustrates a schematic diagram of an environment for content generation, according to at least one embodiment.

Approaches in accordance with various embodiments provide systems and methods for three-dimensional (3D) object generation to jointly transfer a shape style and a texture style from one 3D asset (e.g., 3D object model) to another 3D asset. Various embodiments may enable a content generation tool that enables a user to generate custom 3D content. Users may select a source 3D model as an input and a target 3D model representing a desired output style. Additionally, in one or more embodiments, a texture map may be provided to apply a texture, which may include a pattern or visual appearance, to the output 3D image, such that the desired output will share both a geometric appearance of the target and also a textural (e.g., visual) appearance of the target. Global geometric style may be presented as approximate semantic part shapes for the object, where different components of an object are segmented and then selectively and separately adjusted. In various embodiments, stylization leaves local geometric details of the source unchanged, which may lead to higher-quality models that do not skew or otherwise exaggerate features. Various implementations may include at least two network components, a geometric style transfer network and a texture style transfer network. It should be appreciated, however, that various embodiments may include more or fewer network components, and certain features may be re-used or otherwise repurposed to perform one or more functions. The geometric style transfer network may be a trained neural network that is trained using a set of non-textured shapes. In contrast, the texture style transfer network may be trained on one or more image datasets. These networks outputs may be combined and then refined to optimize both geometry and texture.

One or more embodiments of the present disclosure may be directed toward one or more transformations (e.g., an affine transformation) applied to specific segmented components of an object. Additionally, part-aware geometric losses may be utilized to train the geometric style transfer network. As noted, evaluations of part-aware geometric losses may enable more refined warping or adjustments of different component parts of the 3D object, thereby providing an improved output. In at least one embodiment, segmentation is pre-determined, for example based, at least in part, on a type of object being evaluated. In other examples, segmentation is user-defined, where a user selects different features of the object. Additionally, in one or more embodiments, part segmentation is learned by one or more machine learning systems based, at least in part, on training data to minimize losses when adjusting portions of the object.

Various embodiments of the present disclosure may further utilize multi-view rendering of 3D objects to both geometric and style transfer for 3D objects. For example, one or more masks may be applied in order to determine which features or adjustments to features may be attributed to background information, rather than the object. As a result, adjustments attributed to the background may be removed (e.g., weighted to zero) to further refine adjustments and changes to the object. Accordingly, systems and methods may be utilized to generate high quality 3D object models, which may be used for content generation. Additionally, users may utilize such systems and methods to expand training datasets for 3D models, which may be insufficient for various applications.

As shown in FIG. 1, an environment 100 includes a user device 102 to receive and consume one or more objects (e.g., assets) which may be three-dimensional (3D) object models. For example, the user device 102 may submit a request over a network 104 to a content provider environment 106. It should be appreciated that various features and components are shown as being hosted within the same environment for convenience only and that these systems may be separately hosted or provided, for example with different distributed computing systems. Moreover, additional features or components may also be included, such as support systems, machine learning systems, databases, and the like. The content provider environment 106 may include one or more systems that facilitate content transmission as well as content generation. In at least one embodiment, the user device 102 may utilize the content provider environment 106 to submit a request to generate 3D objects using one or more modules or software packages provided by the content provider environment. Accordingly, in at least one embodiment, the content provider environment 106 may enable both consumption and generation of various types of content.

An interface 108 is included to receive and direct the information to appropriate locations. The interface 108 may include an API that a user may gain access to, for example via an authorized account, to execute one or more functions within the content provider environment 106. Different accounts may have different permission levels and access to different portions of the content provider environment 106 or other associated systems. By way of example only, users of the user device 102 may have limited permissions to access particular software packages hosted and distributed by the content provider environment 106, while other users may have more expanded access. Accordingly, embodiments of the present disclosure may be directed toward configurations where the user has the appropriate permissions to utilize software systems provided by the content provider environment 106.

In an example, the content provider environment 106 includes a content library 110, which may store one or more pieces of content, such as 3D object models, video content, image content, audio content, textual content, or combinations thereof. The content library 110 may be accessible by the user and/or other systems and may be utilized to generate additional content or as standalone content for consumption, among other options. In at least one embodiment, a content manager 112 receives and directs requests from the user device 102, such as to retrieve specific content or to provide access to one or more software packages. As noted above, the content manager 112 may further verify, for example by evaluating one or more credentials, whether a user is authorized to access one or more portions of the content provider environment 106.

FIG. 1 further illustrates a content generation module 114, which may be accessible by a user to create content. The content generation module 114 may include, or have access to, one or more memories or processors to execute software commands stored on one or more memories. In at least one embodiment, content generation module 114 executes commands in the form of one or more algorithms that include a set of instructions to perform one or more tasks. In this example, content generation module 114 may be utilized to generate one or more 3D object models, which may then be used with other portions of the content provider environment 106, such as a publishing module 116, an integration module 118, or a testing module 120. It should be appreciated that the publishing module 116 may be used to publish or make content available for consumption, the integration module 118 may be used to incorporate generated content into other content types, such as loading a model into a game, and the testing module 120 may be used to test or debug the content generated.

Content generation may be a difficult task from the perspective of both users and system resources. For example, the user may determine proportions of an object model, may determine different shapes for different features, may determine textures to apply to the object model, and may then render the model for use. In examples for video games, AR/VR content, animated movies, or other user consumed content, manual content generation may have a sufficient return on investment for individual users to generate individual characters, such as main characters within a video game where the user will have frequent and long-term interaction with the character. However, minor characters, characters in the background, and the like may be preferably computer-rendered or otherwise automatically generated to better direct resources. For example, for a sports game, it may be preferable to generate spectators in the crowd via an automated process because users are unlikely to focus on the spectators in the crowd. In another example, machine learning systems often utilize libraries for training purposes and it may be difficult to obtain a sufficient number of high quality 3D object models to effectively train a network. Accordingly, systems and methods of the present disclosure may be directed toward 3D asset style transfer where, given a source 3D asset and a target 3D asset, a shape style and texture style may be jointly transferred from one 3D asset to another to generate a new 3D asset. As a result, 3D content generation may be simplified for both content generation and also generation of potential training object models.

Systems and methods of the present disclosure overcome problems associated with style transfer methods that utilize deformation transfer between 3D assets. These methods may include one or more guidance shape correspondences or transferring texturing mappings by minimizing a distortion energy, but due to their reliance on shape correspondence, may not accurately generate new assets. Furthermore, these methods may include mesh generation, which may be resource intensive. Deep learning methods cannot transfer texture maps and transferring image styles to maps using other methods fails to stylize the texture maps over a new 3D asset. Accordingly, systems and methods may be utilized to jointly transfer both geometry and texture to a new 3D asset.

Various embodiments of the present disclosure may utilize an input source 3D model representing content and a target 3D model representing a desired style or desired output. Both surface geometries and a texture map of the target 3D model are utilized to generate a wide range of 3D model variations. In at least one embodiment, style of the object is represented, at least in part, as a global geometric style approximated by semantic part shapes of the object. As a result, local geometric details of the source may remain unchanged or substantially unchanged, which may lead to higher-quality models. In one or more embodiments, systems and methods may stylize the input asset via one or more part-aware transformations. Texture style of the 3D object may be defined, at least in part, by one or more image style transfer techniques. In at least one embodiment, a style transfer network may utilize a geometric style transfer network and a texture style transfer network to generate an output 3D object model. For example, the geometric style transfer network may be trained on non-textured shapes while the texture style transfer network is trained on image datasets. Joint operation of these networks may be enabled by one or more optimization steps (e.g., joint optimization). Optimization may include a multi-view rendering setting to achieve geometric and texture transfer for 3D assets.

Figure 2A:
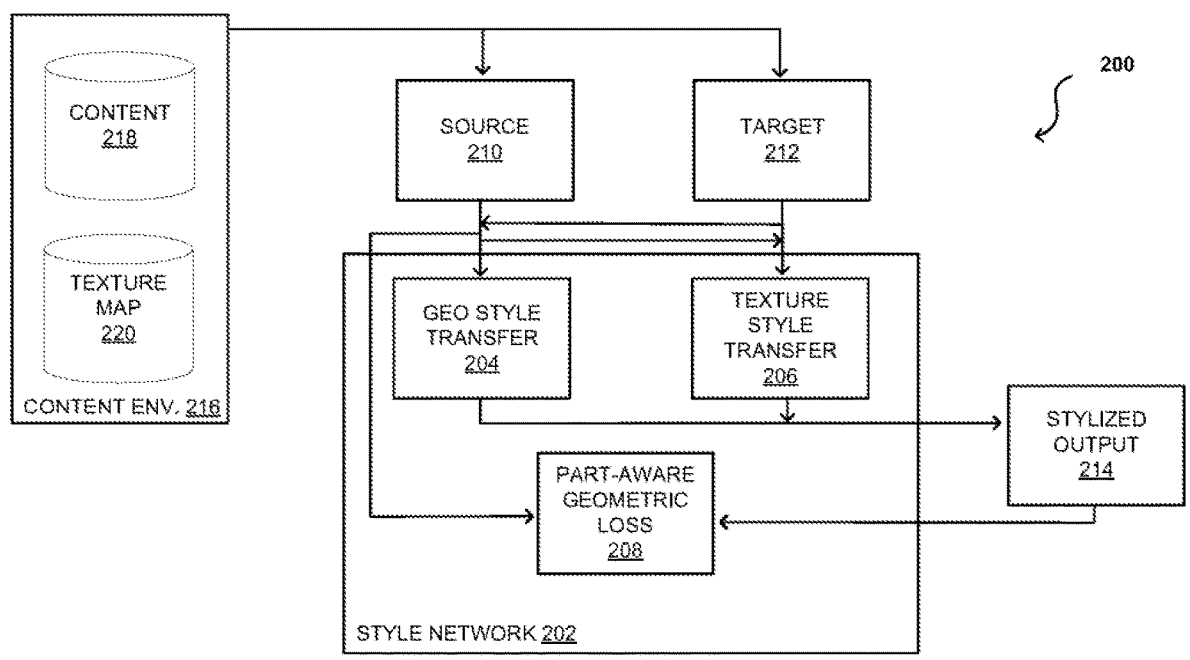
FIGS. 2A and 2B illustrate a schematic diagrams of a style transfer network, according to at least one embodiment.

FIG. 2A illustrates an environment 200 that may be used with one or more embodiments of the present disclosure. In this example, the environment 200 includes a style network 202 that incorporates a geometric style transfer network 204 and a texture style transfer network 206. It should be appreciated that the networks 204, 206 may include one or more trained machine learning systems, which may further incorporate one or more neural networks, databases including training data, input APIs, and the like. By way of example, the geometric style transfer network 204 may be trained on a set of non-textured shapes and the texture style transfer network 206 may be trained on image datasets.

Further illustrated is a part-aware geometric loss module 208, which may receive input information from a source 210 and a target 212, which may correspond to source and target 3D assets, such as object models. Moreover, an output 214 of the networks 204, 206 may also be provided to the part-aware geometric loss module 208. In various embodiments, the part-aware geometric losses are utilized in training of the network 202 (e.g., training of one or more of the networks 204, 206), such as with manually labeled sets of training shapes with semantic part labels that may utilize a semi-supervised BAE-NET to predict part labels for shapes. As will be described below, training of the BAE-NET may be further refined to be less sensitive to segmentation noise.

In operation, a content environment 216 may include a content database 218 and/or a texture map database 220. It should be appreciated that the content database 218 and the texture map database 220 may be integrated such that content may be stored along with an associated object model. In various embodiments, a source asset (e.g., object model) is selected along with a target asset (e.g., object model). The network 202 may then be trained to take, as an input, the source 210 and the target 212 and, thereafter, manipulate or warp the source 210 to appear more like the target 212, for example in both shape (e.g. geometry) and appearance (e.g., texture). As an example, if the source 210 is a small dog and the target 212 is a cartoon dog, one or more features of the source 210 may be warped or adjusted to correspond to more closely approximate characteristics or aspects of features of the target 212. Continuing with the example, a cartoon dog may have a larger head-to-body ratio than a real dog, may have larger eyes relative to a size of the face, and the like. Accordingly, one or more of these features may be adjusted or warped to produce the output 214 having features similar to the target 212, while maintaining various aspects of the source 210.

In various embodiments, it should be appreciated that the output 214 may be further processed, for example using a differentiable renderer, as will be described below. Furthermore, various aspects of the present disclosure have been removed for clarity and simplicity with the following disclosure, such as various training databases, transformation modules, and the like.

Figure 2B:
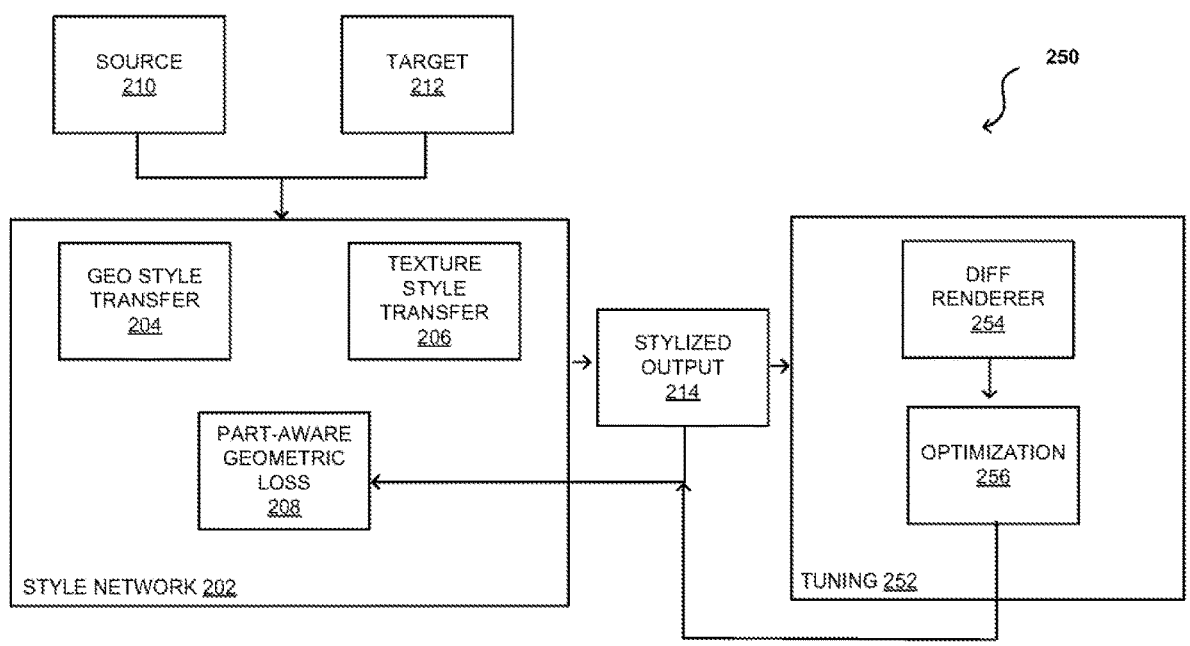

FIG. 2B illustrates an environment 250 that may be used with one or more aspects of the present disclosure. In this example, the environment 200 of FIG. 2A is expanded to include a tuning network 252 that may be utilized to provide higher quality transformations from the source 210 to the stylized output 214. It should be appreciated that the tuning network 252 may be incorporated within the style network 202 in other embodiments and that representation as different networks is for illustrative purposes and is not intended to limit the scope of the present disclosure.

In this example, the stylized output 214 is provided to the tuning network 252 for refinement and adjustment. For example, a differentiable renderer 254 may render the textured stylized object in multiple views with a rasterization-based differentiable renderer. For example, six different views may be generated in order to evaluate the stylized output 214 from multiple angles. Moreover, an optimization module 256 may evaluate masked content and style loss on the multi-view rendering of the differentiable renderer 254 for joint optimization of both geometry and texture. In various embodiments, the two networks both hallucinate textures that respect target identity and source details, and adjust geometric transformations to make texture transfer easier. The multi-view rendering may include six orthogonal views that are randomly rotated in each iteration of the tuning network 252. As a result, multiple views may be evaluated with each pass, rather than just focusing on a set number of views. However, it should be appreciated that processing resources may be conserved by specifying a number of passes or specific angles for the optimization, for example, angles that may correspond to likely view angles for the object in use.

In various embodiments, a background mask is output by the differential renderer 254 to mask out features computed from irrelevant background pixels. This background mask may be generated for each different view, and then compared between individual views of the various views, in order to identify which features are not related to the object, but rather, are generated due to the background. Accordingly, geometric losses may be refined based, at least in part, on the mask evaluation in order to generate improved stylized objects. In various embodiments, the generated masks may be utilized for evaluation of both masked style loss and masked content loss. That is, both texture and geometric feature transfer may be optimized via the masks.

Figure 3:
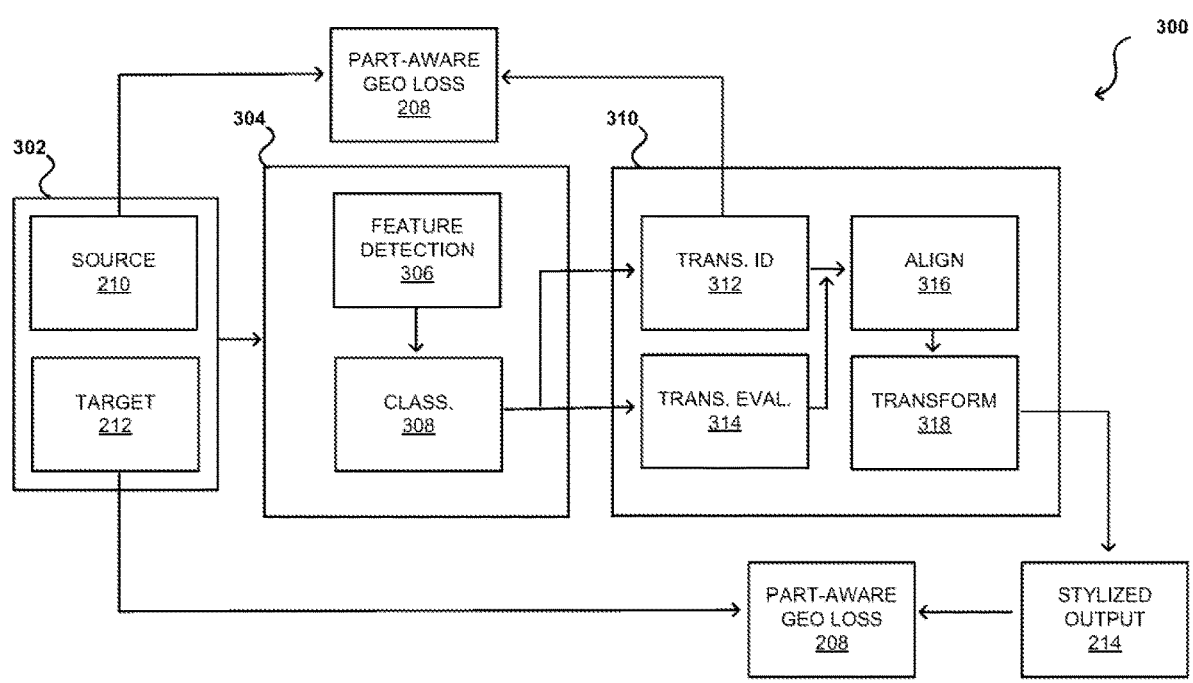
FIG. 3 illustrates a schematic diagram of geometric style transfer network, according to at least one embodiment.

FIG. 3 illustrates a style transfer network 300 that may be used with embodiments of the present disclosure. In one or more embodiments, features from the networks 200, 250 may be incorporated into the style transfer network 300. In this example, an input 302 includes the source object 210 and the target object 212. As noted herein, the source and target objects 210, 212 may correspond to 3D object models that include geometric features and/or texture features, such as texture maps. In one or more embodiments, the geometric features may be represented as point clouds representative of points in a 3D space. In at least one embodiment, the point clouds may be utilized by one or more 3D geometric style transfer networks and the texture maps may be utilized by one or more texture style transfer networks.

The input 300 is provided to a detection network 304, which may include one or more machine learning systems in order to evaluate the point clouds and/or texture maps. In this example, a feature detection module 306 may include one or more neural networks, such as a point-voxel CNN (PVCNN) for deep learning. By way of example only, the feature detection module 306 may include 4 PVConv layers within the PVCNN encoder. The PV-Conv may have a starting voxelization resolution of 32 and decrease to 16, 8, and 1 while features are aggregated. It should be appreciated that the PVCNN is provided by way of example only, and that in alternative embodiments, different networks with different structures may be utilized in place of, or in addition to, the PVCNN.

The aggregated features are then evaluated by a classifier 308, which may include a multilayer perceptron (MLP), CNN, or any other reasonable classifier. In examples that include the MLP, 4 fully-connected layers may be used and latest feature vectors may be connected to all 4 FC layers in the network. Such a configuration provides an output of N× m, where N is a number of semantic parts and m is the number of parameters needed for representing respective ellipsoids and/or transformations (e.g., affine transformations) of each part. By way of example, an ellipsoid may need 9 parameters. As another example, an affine transformation may need an additional 9 parameters. Accordingly, such a configuration with 11 semantic parts would need 198 parameters as the output of the MLP. It should be appreciated that outputs may be reduced by reducing a number of semantic parts representative for one or more categories of objects.

The classified semantic parts may be output and transmitted to a transfer module 310 that transforms the source asset to match the style of the target asset. In this example, a transformation identifier 312 may correspond to an ellipsoid to approximate one or more semantic parts of the object. That is, a predicted ellipsoid representation may be utilized to represent which part or component of the object is transformed. The ellipsoid may be represented as $E_i$ where i is each semantic part of the source shape.

Additionally, in at least one embodiment, a transformation evaluation 314 may correspond to a transformation function, which may be a 3D affine transformation, represented as $A_i$. That is, the 3D affine transformation may be utilized to represent how to deform an identified part of an object. It should be appreciated that the affine transformation may include rotation, translation, and scaling components along 3 axes. In at least one embodiment, the 3D affine transformation may be used for warping of the semantic parts in order to better match the target. While this example includes affine transformations, it should be appreciated that various other transformations may be utilized in one or more other embodiments, in place of or in addition to affine transformations. By way of example only, projective, similarity, of Euclidean transformations may also be utilized, among others. Outputs may then be utilized to compute a smooth affine transformation field to deform the source geometry, while preserving fine geometric details.

As noted above, various embodiments of the present disclosure enable part-aware transformations. Parameters of the transformation identifier 312 are used to compute smooth skinning weights for any point on the source shape. In combination with the transformation evaluation 314, formation for any source point may be determined. An alignment module 316 may align points along the predictions (e.g., along the ellipsoid) by defining a 3D Gaussian, as shown in Equation (1)

$$g_i(p) = G(p | T_i, \lambda S_i R_i (S_i R_i)^T) \quad (1)$$

where p is a point on the source shape P, $T_1$ is the mean of the Gaussian, $\lambda S_i R_i (S_i R_i)^T$ is the covariance matrix, and $\lambda$ is a fixed scalar for controlling the spread. This series of functions may be utilized to define an N-channel blending field. The normalized blending field can be used to interpolate the affine transformations $A_i$ of all semantic parts to obtain a single 3D affine transform field $\phi$, via the transform module 318. Accordingly, the stylized output 214 may be generated by warping the source shape P with the affine transform field, which may be represented as $\phi(P)$. It should be appreciated that, in order to reduce processing or otherwise conserve resources, Gaussians and the blending field may be generated at intervals or particular regions, such as at every vertex of the source mesh.

Various embodiments also include the part-aware geometric loss module 208, which may be used for training one or more portions of the networks 200, 250, 300. Training may include, at least in part, manually determined or labeled semantic parts for an input dataset. It should be appreciated that these manually labeled parts may represent a ground truth. However, in other embodiments, training may enable automatic labeling of various parts, such as parts that are labeled with a confidence value exceeding a threshold. One or more embodiments may include a semi-supervised BAE-NET to predict part labels. As will be described below, input objects may be segmented into semantic parts that are utilized with the one or more transformation procedures in order to generate the stylized output.

As an example, an input object may be segmented into any number of parts, where the number may be predetermined based, at least in part, on a type or identification of the input object. For example, certain objects may include more or fewer segmented parts. In one or more embodiments, prediction quality may be higher for larger regions, and as a result, it may be beneficial to set a threshold size for various components for segmenting to reduce noise. However, segmentation noise may also be reduced by defining a part-aware geometric distance, according to Equation (2)

$$D_{part-aware}(P, Q) = Ch_{L1}(P, Q) + \sum_{i \in L} Ch_{L1}(P_i Q_i) \quad (2)$$

where P, Q are the sampled point sets on the source and target shapes, respectively, $P_i$ and $Q_i$ denote the point subsets for part i, and $Ch_{L1}(P,Q)$ is the $L_1$-Chamfer distance. It should be appreciated that noise associated with the part labels from the BAE-NET may lead to only partial reliance on the part-wise chamfer distances. In at least one embodiment, the loss function may be defined according to Equation (3)

$$\text{Loss}(P,Q,\phi) = D_{part-aware}(\phi(P),Q) + D_{apart-aware}(\xi(P),P) \quad (3)$$

where $\xi(P)$ are the surface points of all ellipsoids $\{E_i\}$ predicted for source shape P, and $\phi(P)$ is the warp of the source shape, as described above.

As noted above, various embodiments may also incorporate one or more texture style transfer networks. These networks may be utilized, in combination with the tuning module described above in order to enable awareness of geometric properties with respect to the transferred textures, which may be absent in unlabeled texture images alone. In at least one embodiment, the texture style transfer network may incorporate an encoder associated with VGG-19 pre-trained on a dataset, such as ImageNet, which the decoder may be trained on another image set, such as MS-COCO. Furthermore, in certain embodiments, the linear transformation module may be trained on MS-COCO as the content image set, and the WikiArt dataset as the style image set.

While not illustrated in FIG. 3, as noted above, one or more tuning networks 252 may be utilized with embodiments of the present disclosure in order to fine tune both geometry and texture style transfer networks for a specific source and target pair. The differential renderer 254 may render the textured stylized object in multiple views with a rasterization-based differentiable renderer, such as Nvdiffrast. Furthermore, in embodiments, masked content and style loss on the multi-view rendering may be utilized for joint optimization of geometry and texture. For example, joint optimization of the parameters of the classifier 308 (e.g., the MLP) and of one or more linear transform modules of the texture style transfer network may be used to minimize losses defined over both the geometry and multi-view rendering of the stylized object, as shown in Equation (4)

$$f(\phi, \hat{m}) = \frac{1}{N} \text{Loss}(P, Q, \phi) + \quad (4)$$
$$\beta \sum_v L_{content}[F_v(\phi(P), \hat{m}), F_v(P, m)] + \gamma \sum_v L_{style}[F_v(\phi(P), \hat{m}), F_v(Q, m')]$$

where m and m' are the texture images of the source P and target Q, and $\hat{m}$ is the stylized texture image. In one or more embodiments, a source uv map may be kept fixed. $F_v(P,m)$ is the set of multi-level VGG features of the rendered pixels for shape P with texture m under camera view v. As noted above, background mask output by the renderer may be used to mask out features computed from irrelevant background pixels. Moreover, Loss from Equation (3) may be incorporated. It should be appreciated that, in operation, different layers may be utilized for style loss and/or content loss. Moreover, it may be desirable to generate camera views to cover the surface of the stylized object, and as a result, rotation between views may be randomly rotated using a common Euler angle in each iteration of optimization.

Figure 4:
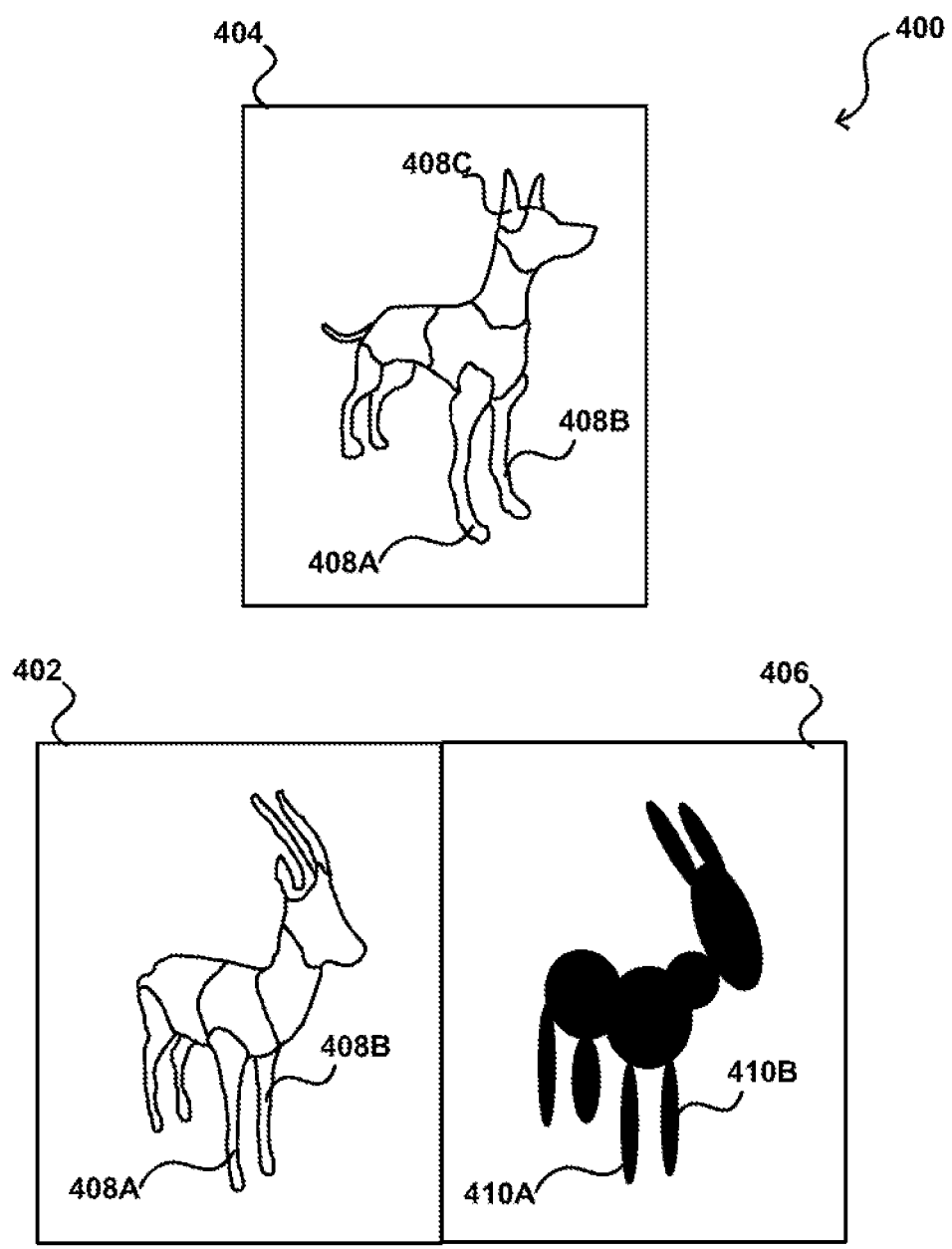
FIG. 4 illustrates an example segmentation procedure, according to at least one embodiment.

FIG. 4 illustrates an example segmentation and prediction 400 sequence. In this example, a source image 402 may be provided to one or more networks, such as the BAE-NET described above, to be segmented into various semantic parts in accordance with segmentation associated with a training image 404. In certain embodiments, the training image may be manually labeled and a number of semantic parts may be determined based, at least in part, on a type or classification of the source image 402. In this example, the source image 402 corresponds to an animal and, for that classification, the training image 404 includes 11 semantic parts. It should be appreciated that other classifications may include more or fewer semantic parts, and moreover, that animals may also be defined with more or fewer semantic parts. Further illustrated is an ellipsoid image 406, which includes predicted ellipsoids based, at least in part, on the semantic parts.

In this example, the training image 404 includes different semantic parts 408, such as a front right leg 408A, a front left leg 408B, and so forth. As shown, the network learns to distinguish and identify these features within the source image 402, so that similar semantic parts 408 are identified, such as the front right leg 408A, among others. As noted above, the ellipsoid approximations 410 of those semantic parts may then be generated, such as the front right leg ellipsoid approximation 410A, among others. Thereafter, transformations or warping of the image may enable adjustment of the source image 402 to match a style of a target image.

Figure 5:
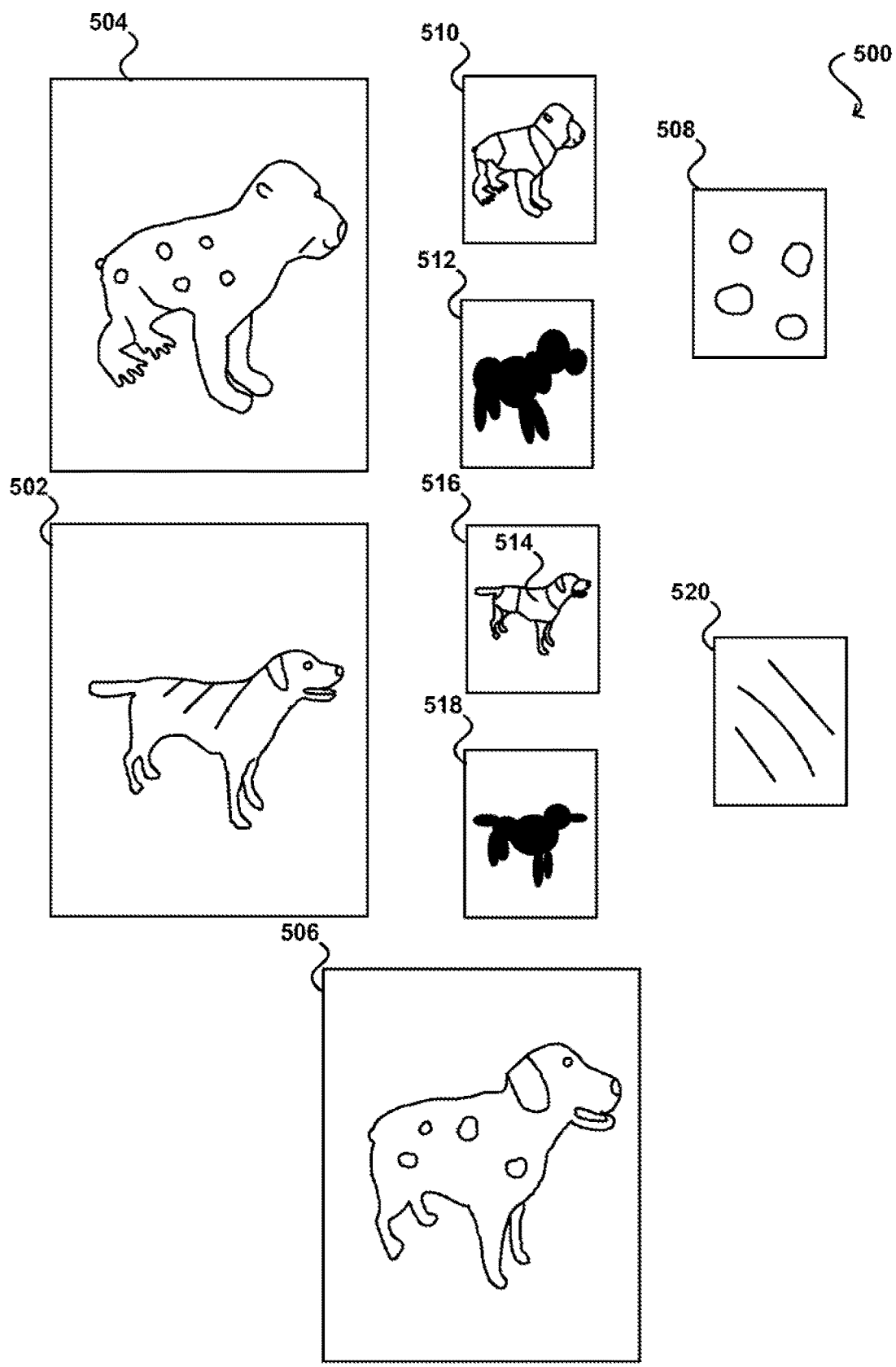
FIG. 5 illustrates an example style transfer procedure, according to at least one embodiment.

FIG. 5 illustrates an example style transfer procedure 500 that may be utilized with embodiments of the present disclosure. In this example, a source object 502 is warped and adjusted with reference to a target object 504 in order to produce a stylized output 506, which may maintain one or more features of the source object 502, but also warp or otherwise adjust various features toward the style associated with the target object 504, where style refers to one or more geometric properties, a textural appearance, or a combination thereof. In this example, the target object 504 is associated with a target texture 508, a target segmentation 510, and a target ellipsoid estimation 512. It should be appreciated that each of these components may not be generated, but are provided by way of example to illustrate warping or transformations of the source object 502.

The source object 502 may be provided to one or more networks 200, 250, 300 and may be processed in order to identify one or more features, which may correspond to one or more semantic parts 514 for dividing the source object 502 to enable part-aware transformation. In this example, a source segmentation 516 includes an outline of the source object 502 with different semantic parts 514, which may correspond to the semantic parts of the target segmentation 510. As noted above, in one or more embodiments, a type or classification for the target object 504 and/or source object 502 may be determined in order to select a pre-set number of parts for the semantic segmentation. In other embodiments, the target object 504 may be segmented and then a similar number may be used for the source object 502. As noted above, a source ellipsoid estimation 518 may be generated based, at least in part, on information from the source segmentation 516. Furthermore, in this example, a source texture map 520 is also illustrated. The source texture map 520 differs from the target texture 508, for example, by including stripes rather than spots.

In one or more embodiments, the ellipsoids corresponding to the source ellipsoid estimation 518 may be warped or otherwise transformed in order to adjust one or more semantic parts of the source object 502 to be closer to the target object 504 in geometric appearance. For example, in this example, the head of the source object 502 is enlarged. Furthermore, the tail of the source object 502 is removed and/or shortened to correspond to the target object 504. In this manner, the stylized output 506 may be generated to include certain characteristics of the source object 502, but transformed in the style of the target object 504. Additionally, in various embodiments, the target texture 508 is also transferred and applied to the stylized output 506, as noted above.

Figure 6A:
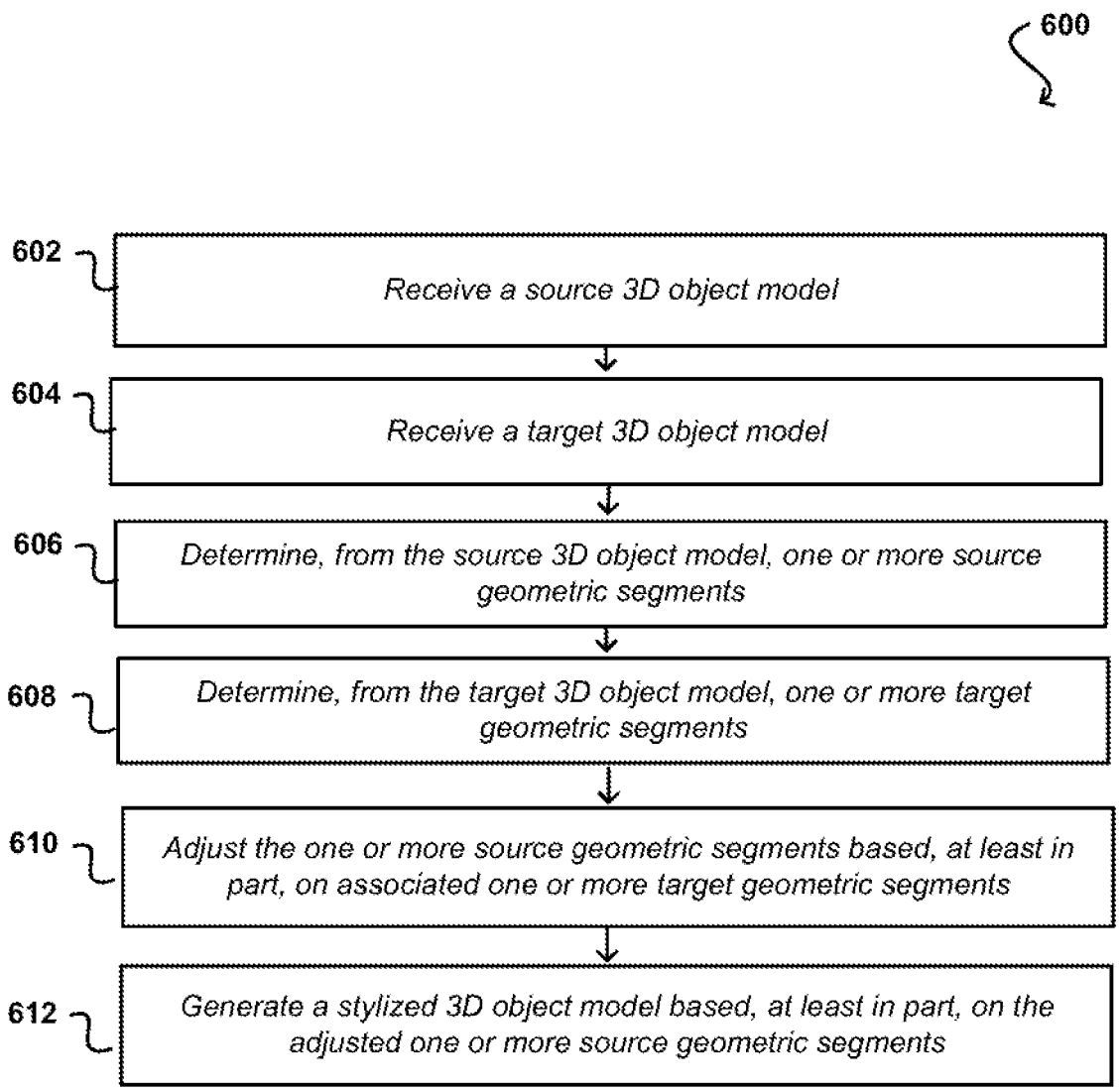
FIG. 6A illustrates an example process for generating a stylized object model, according to at least one embodiment.

FIG. 6A illustrates an example process 600 for generating a stylized 3D object model. It should be understood that for this and other processes presented herein that there can be additional, fewer, or alternative steps performed in similar or alternative order, or at least partially in parallel, within scope of various embodiments unless otherwise specifically stated. In this example, a source 3D object model is received 602. For example, the source 3D object model may be provided by a user associated with a request or may be retrieved from a storage location, such as a database. In at least one embodiment, a target 3D object model may be received 604. As noted above, the target 3D object model may also be provided by a user, may be selected from a database, or may be retrieved from one or more storage locations. In various embodiments, the target 3D object model may be associated with particular content, and as a result, may be limited or otherwise restricted to certain content types based, at least in part, on a desired outcome.

In various embodiments, one or more source geometric segments are determined from the source 3D object model 606. For example, one or more machine learning systems may identify features within the source 3D object model and then label or otherwise classify and segment the features. In at least one embodiment, one or more target geometric segments are determined from the target 3D object model 608. The target 3D object model may be used as a desired outcome, or at least a guide, for a stylized 3D object model. Accordingly, the one or more source geometric segments may be adjusted based, at least in part, on associated one or more target geometric segments 610. By way of example, related geometric segments may be adjusted, such as a head portion of an animal or a windshield of a vehicle. The correlations may be based on how the objects were segmented so that adjustments are provided on a part-wise basis. A stylized 3D object model may be generated 612. For example, the adjustments may be applied to ellipsoid estimations and one or more transformations may adjust or warp the ellipsoids. Furthermore, various part-aware geometric loss modules may be utilized for further training or refinement. In this manner, geometric features of an object model may be evaluated and adjusted.

Figure 6B:
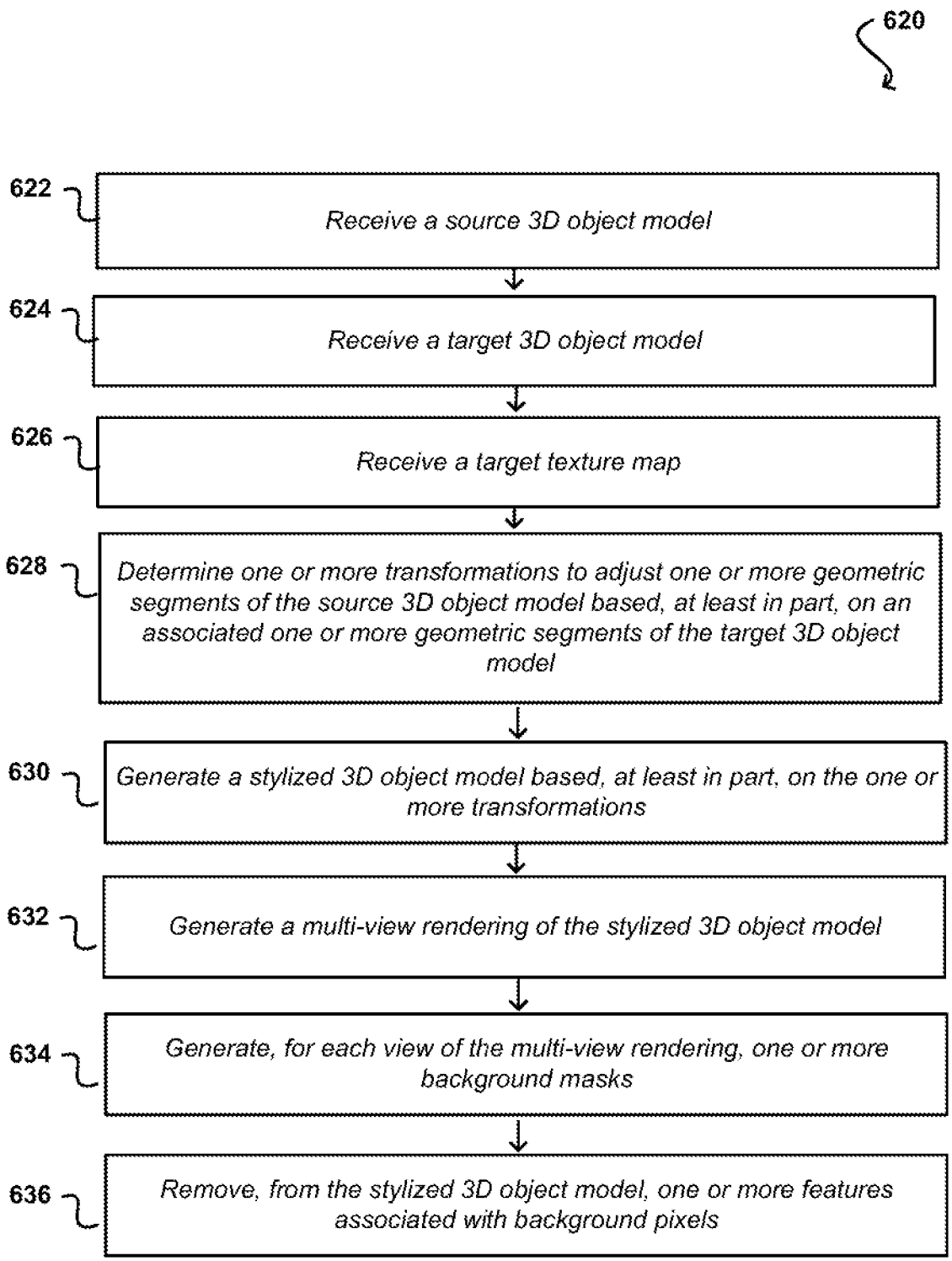
FIG. 6B illustrates an example process for generating a stylized object model, according to at least one embodiment.

FIG. 6B illustrates an example process 620 for generating a stylized 3D object model. In this example, a source 3D object model is received 622. For example, the source 3D object model may be provided by a user associated with a request or may be retrieved from a storage location, such as a database. In at least one embodiment, a target 3D object model may be received 624. As noted above, the target 3D object model may also be provided by a user, may be selected from a database, or may be retrieved from one or more storage locations. In various embodiments, the target 3D object model may be associated with particular content, and as a result, may be limited or otherwise restricted to certain content types based, at least in part, on a desired outcome. Additionally, in one or more embodiments, a target texture map is received 626. The target texture map may be associated with a visual appearance of the target 3D object model.

In at least one embodiment, one or more transformations are determined for one or more geometric segments of the source 3D object model 628. For example, the source 3D object model may be segmented and ellipsoid estimations may be generated and compared to associated segments of the target 3D object model. The transformations may be used to generate a stylized 3D object model. In this manner, the source 3D object model may be warped or otherwise adjusted to generate a stylized 3D object model that incorporates features of the target 3D object model 630, such as changing shapes of components or applying features from the target texture map to the stylized 3D object model.

In various embodiments, additional tuning or refinements may be applied. A multi-view rendering of the stylized 3D object model is generated 632. The multi-view rendering may include a pre-set number of views from multiple different angles. In at least one embodiment, one or more background masks are generated for each view 634 and utilized to determine one or more features associated with background pixels. These background pixels may then be removed 636 from the stylized 3D object model.

Data Center

Figure 7:
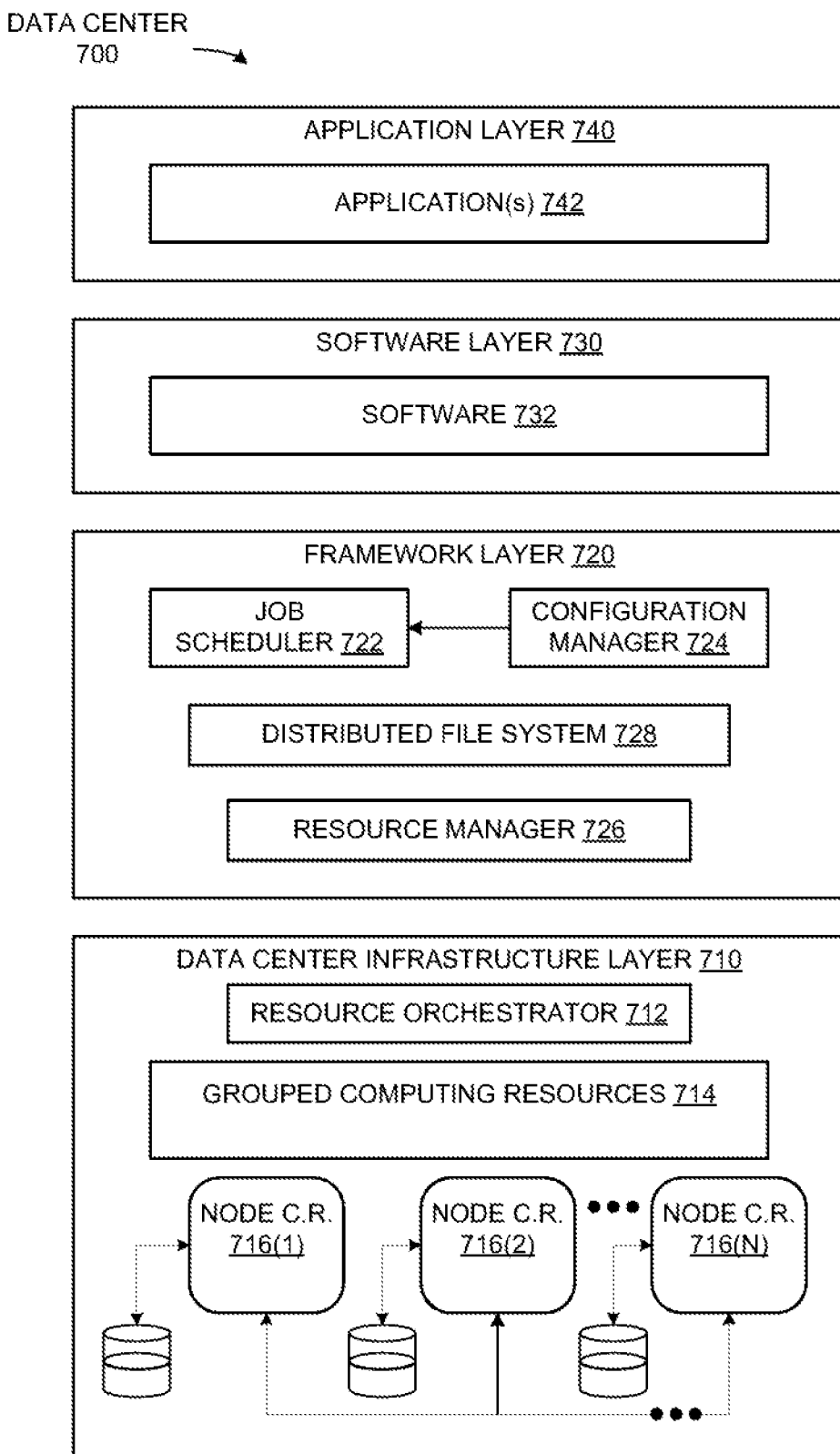
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used for style transfer.

Computer Systems

Figure 8:
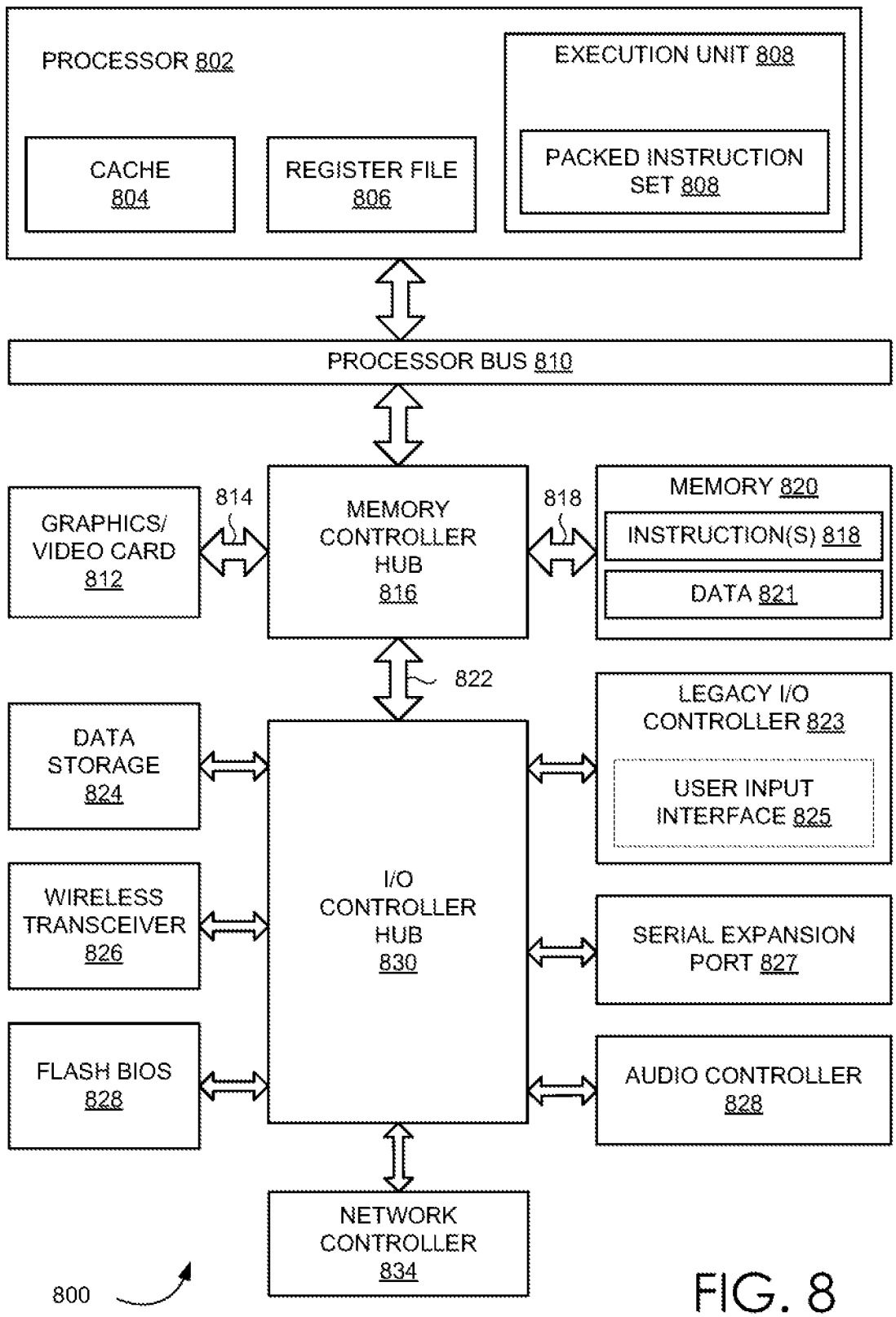
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), edge computing devices, set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used for style transfer.

Figure 9:
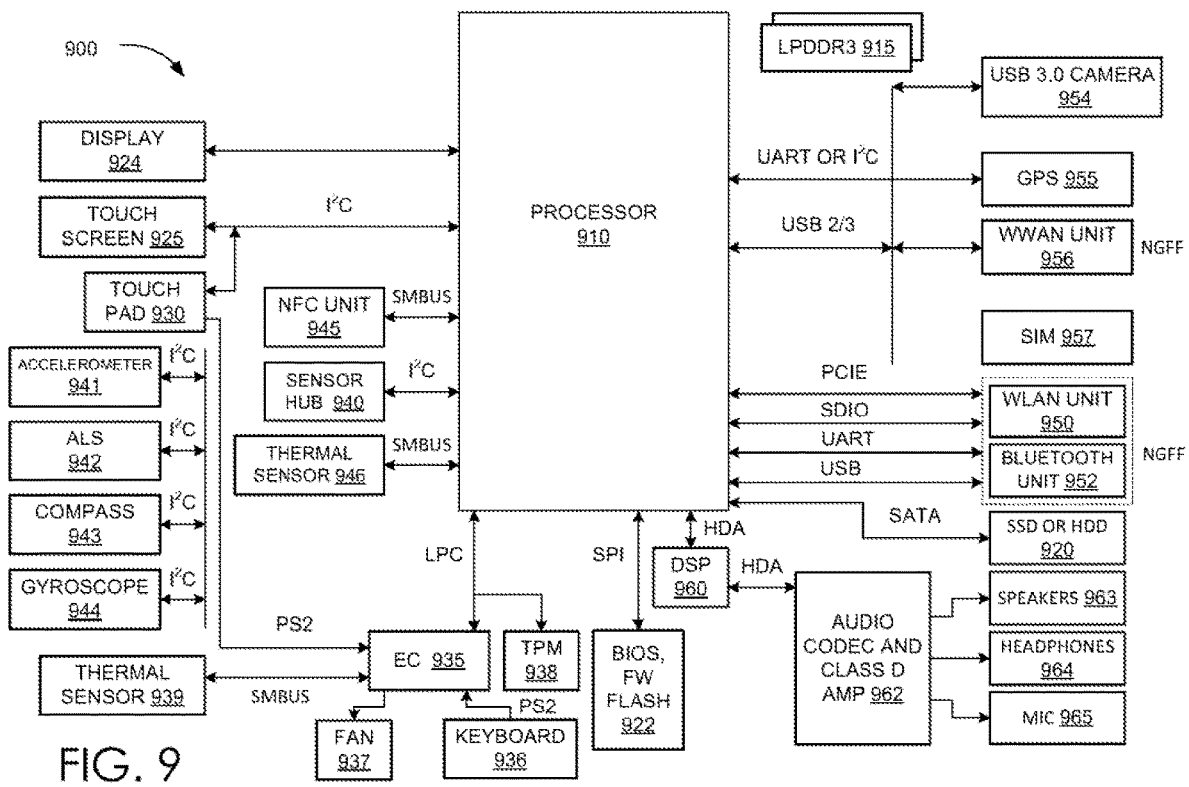
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used for style transfer.

Figure 10:
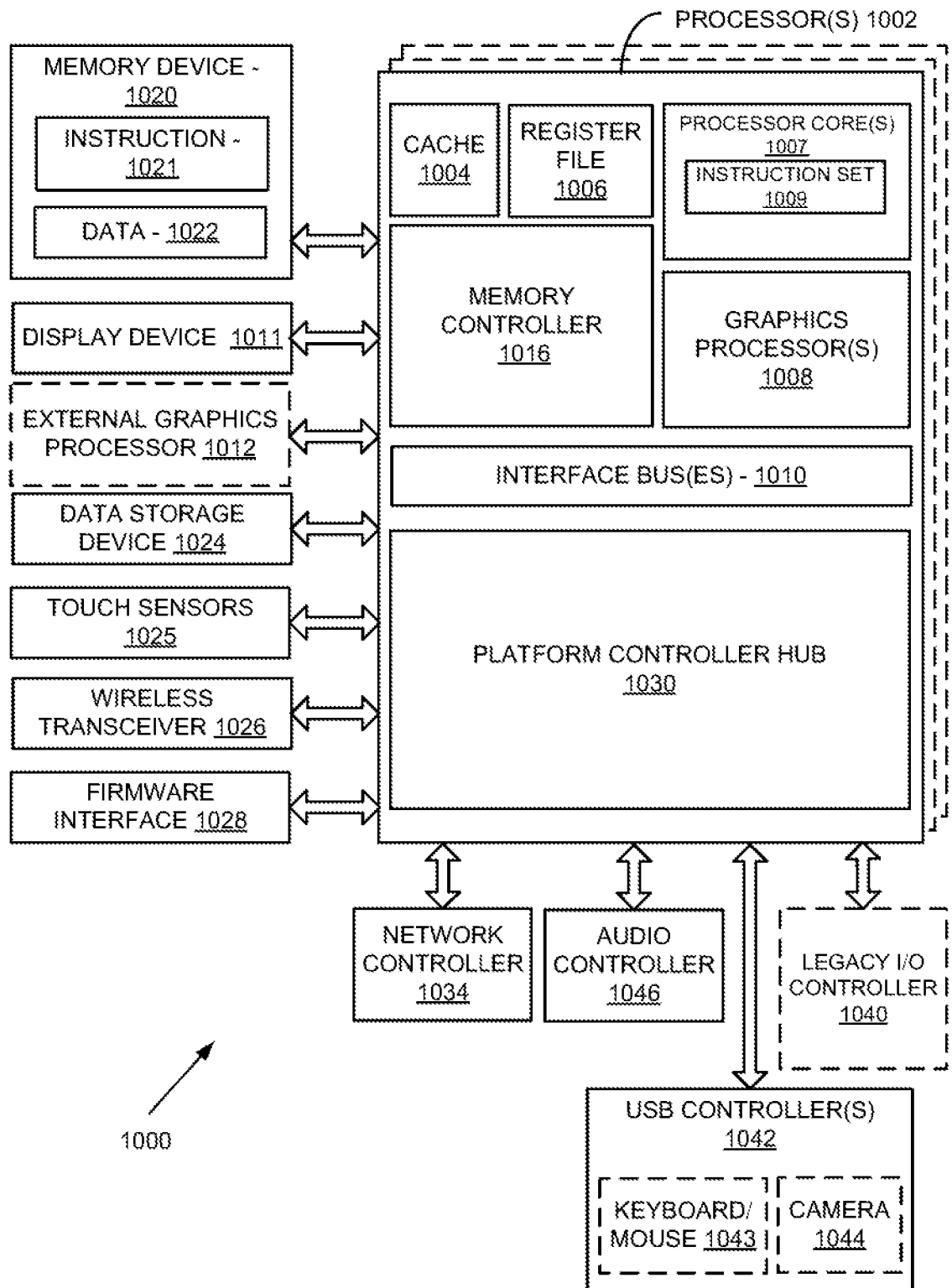
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system or datacenter having a large number of collectively or separably managed processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a cloud computing host platform, a virtualized computing platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, edge device, Internet of Things ("IoT") device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used for style transfer.

Figure 11:
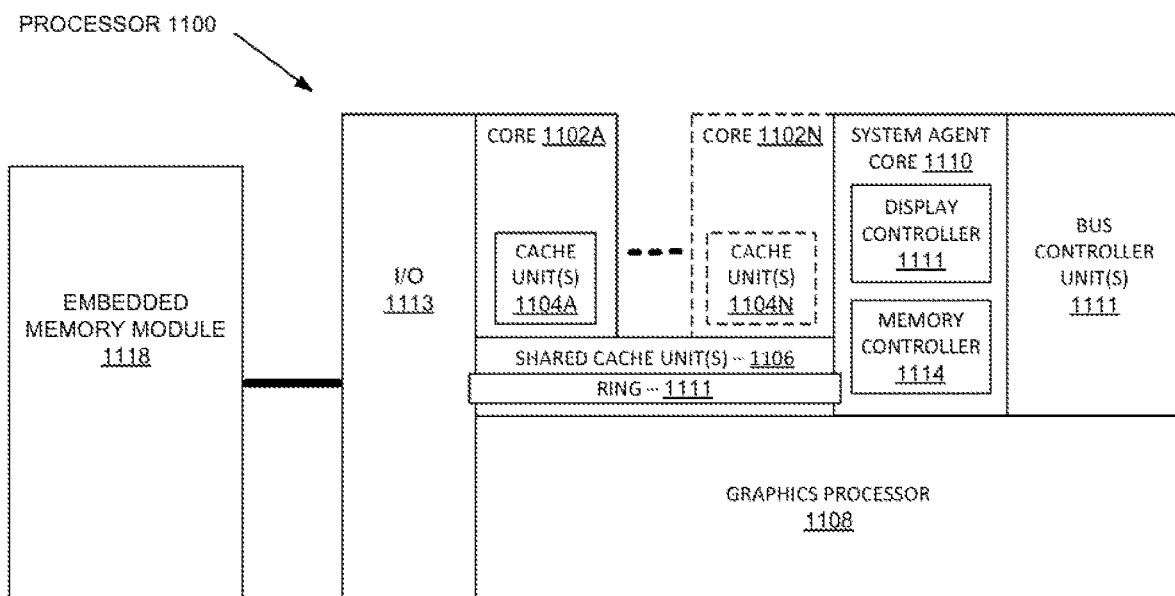
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used for style transfer.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") and/or a data processing unit ("DPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be any processor capable of general purpose processing such as a CPU, GPU, or DPU. As non-limiting examples, "processor" may be any microcontroller or dedicated processing unit such as a DSP, image signal processor ("ISP"), arithmetic logic unit ("ALU"), vision processing unit ("VPU"), tree traversal unit ("TTU"), ray tracing core, tensor tracing core, tensor processing unit ("TPU"), embedded control unit ("ECU"), and the like. As non-limiting examples, "processor" may be a hardware accelerator, such as a PVA (programmable vision accelerator), DLA (deep learning accelerator), etc. As non-limiting examples, "processor" may also include one or more virtual instances of a CPU, GPU, etc., hosted on an underlying hardware component executing one or more virtual machines. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising:
processing, using a trained first neural network, a source object to determine one or more source geometric features of the source object;
processing, using the trained first neural network, a target object to determine one or more target geometric features of the target object;
adjusting a selected source geometric feature based, at least in part, on the one or more target geometric features;
determining an output texture by adjusting a source texture corresponding to the source object based, at least in part, on a target texture corresponding to the target object; and
generating, based at least in part on the adjusted selected source geometric feature and the output texture, an output object.

2. The method of claim 1, wherein determining the output texture comprises:
processing, using a trained second neural network, the source object to determine the source texture corresponding to the source object;
processing, using the trained second neural network, the target object to determine the target texture corresponding to the target object;
adjusting one or more features of the source texture based, at least in part, on the target texture;
generating, based at least in part on the adjusted one or more features, an output texture; and
applying the output texture to the output object.

3. The method of claim 1, further comprising:
generating a plurality of views of the output object, each view of the plurality of views being at a different angle; and
determining, using the plurality of views, one or more features of the output object associated with a background.

4. The method of claim 3, further comprising:
adjusting the output object, based at least in part on the one or more features, to remove the one or more features associated with the background.

5. The method of claim 1, further comprising:
segmenting the source object with respect to the one or more source geometric features of the source object; and
segmenting the target object with respect to the one or more target geometric features of the target object.

6. The method of claim 5, wherein a number of segments for the segmenting is based, at least in part, on an object type for at least one of the source object or the target object.

7. A processor, comprising:
one or more circuits to:
process, using a trained first neural network, a source object to determine one or more source geometric features of the source object;
process, using the trained first neural network, a target object to determine one or more target geometric features of the target object;
adjust a selected source geometric feature based, at least in part, on the one or more target geometric features;
determine an output texture by adjusting a source texture corresponding to the source object based, at least in part, on a target texture corresponding to the target object; and
generate, based at least in part on the adjusted selected source geometric feature and the output texture, an output object.

8. The processor of claim 7, wherein the one or more circuits are further to:
process, using a trained second neural network, the source object to determine the source texture corresponding to the source object;
process, using the trained second neural network, the target object to determine the target texture corresponding to the target object;
adjust one or more features of the source texture based, at least in part, on the target texture;
generate, based at least in part on the adjusted one or more features, an output texture; and
apply the output texture to the output object.

9. The processor of claim 7, wherein the one or more circuits are further to:
generate a plurality of views of the output object, each view of the plurality of views being at a different angle; and
determine, using the plurality of views, one or more features of the output object associated with a background.

10. The processor of claim 9, wherein the one or more circuits are further to:
adjust the output object, based at least in part on the one or more features, to remove the one or more features associated with the background.

11. The processor of claim 7, wherein the one or more circuits are further to:
segment the source object with respect to the one or more source geometric features of the source object; and
segment the target object with respect to the one or more target geometric features of the target object.

12. The processor of claim 11, wherein a number of segments for the segmenting is based, at least in part, on an object type for at least one of the source object or the target object.

13. A system, comprising:
one or more processors to determine one or more source geometric features of a source object, using a trained first neural network, determine one or more target geometric features of a target object, using the trained first network, adjust a selected source geometric featured based, at least in part, on the one or more target geometric features, determine an output texture by adjusting a source texture corresponding to the source object based, at least in part, on a target texture corresponding to the target object, and generate an output object based, at least in part, on the adjusted selected source geometric feature.

14. The system of claim 13, wherein the one or more processors are further to determine the source texture corresponding to the source object using a trained second neural network, determine the target texture corresponding to the target object using the trained second neural network, adjust one or more features of the source texture based, at least in part, on the target texture, generate an output texture based, at least in part, on the adjusted one or more features, and apply the output texture to the output object.

15. The system of claim 13, wherein the one or more processors are further to generate a plurality of views of the output object, each view of the plurality of views being at a different angle, and determine, using the plurality of views, one or more features of the output object associated with a background.

16. The system of claim 15, wherein the one or more processors are further to adjust the output object based, at least in part, on the one or more features, to remove the one or more features associated with the background.

17. The system of claim 13, wherein the one or more processors are further to segment the source object with respect to the one or more source geometric features of the source object, and segment the target object with respect to the one or more target geometric features of the target object.

18. The system of claim 17, wherein a number of segments for the segmenting is based, at least in part, on an object type for at least one of the source object or the target object.

* * * * *